Jan. 10, 1939.   R. R. SEARLES   2,143,091
BEARING
Filed Feb. 11, 1936
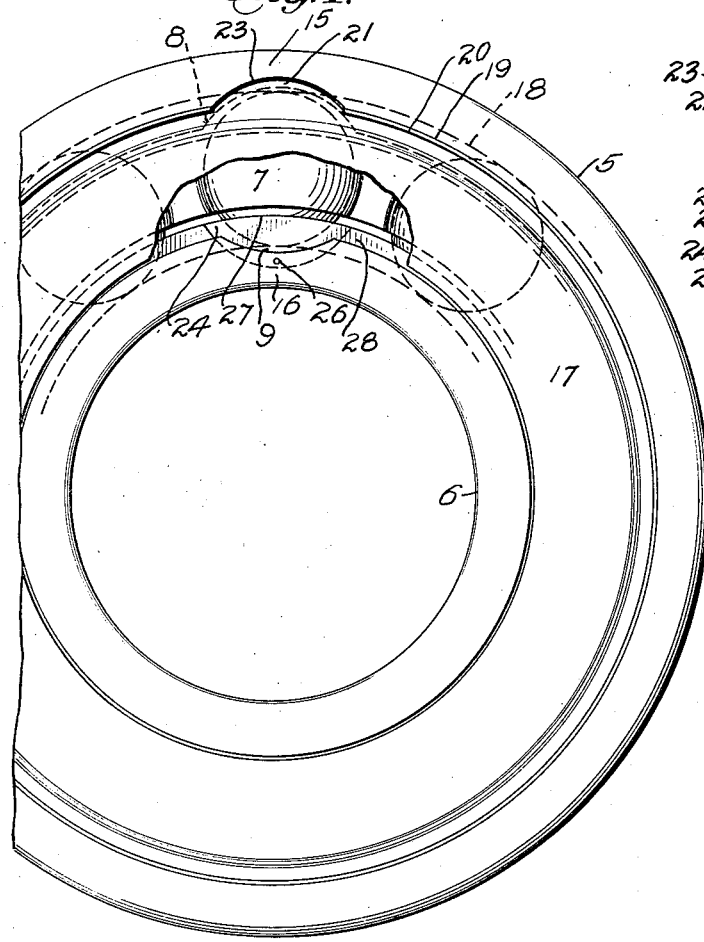
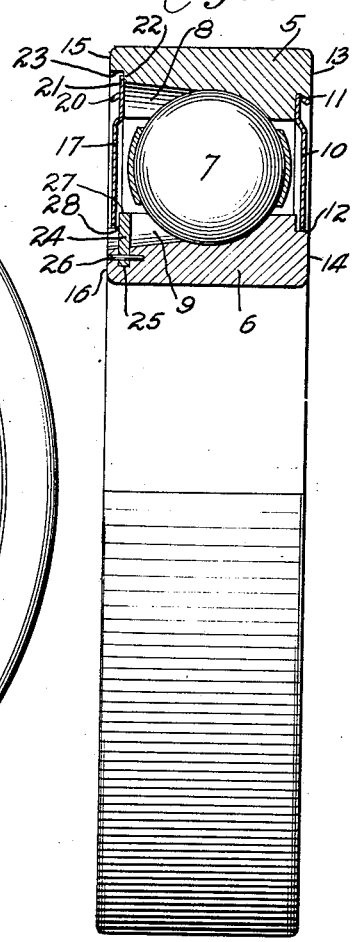
INVENTOR
RAYMOND R. SEARLES
BY
ATTORNEYS Patented Jan. 10, 1939

2,143,091

UNITED STATES PATENT OFFICE 2,143,091

BEARING

Raymond R. Searles, New Britain, Conn., assignor to The Fafnir Bearing Company, New Britain, Conn., a corporation of Connecticut Application February 11, 1936, Serial No. 63,344

4 Claims. (Cl. 308—198)

My invention relates to an anti-friction bearing, particularly a ball bearing. Many bearings have filling slots in one or both of the rings and heretofore when seal plates have been applied to such bearings, such seal plates have usually been seated in grooves which have been of a diameter such that the seal plate would cover the filling slot in the ring carrying the seal plate and the other ring is often rabbeted and the seal plate fits in the rabbet, such rabbet being of a diameter to permit the seal plate to cover or mask the filling slot in such other ring. With deep filling slots, the turned down portion of the ring to provide a seal groove and the turned down portion forming the rabbet leaves a very narrow shoulder for engagement with the bearing housing and shaft nut or other abutment in the bearing mounting.

It is the principal object of my invention to provide means whereby a bearing having one or more filling slots may be provided with a plate seal and so constructed and arranged that the shoulder on the bearing rings to be engaged by housings, shaft nuts or other abutments, may be substantially the same as would be possible with bearings not having filling slots.

In the drawing which shows, for illustrative purposes only, preferred forms of the invention—

Fig. 1 is a fragmentary side view of a ball bearing illustrating features of the invention;

Fig. 2 is a substantially vertical quarter section of the bearing illustrated in Fig. 1 and viewed at right angles thereto.

In said drawing, 5 indicates an outer bearing ring and 6 indicates an inner bearing ring between which rings balls 7 are interposed and run in raceways, as will be understood. The present illustration shows a filling slot 8 in the outer bearing ring and a filling slot 9 in the inner bearing ring through which the last few balls required in the bearing are introduced. When plate seals are provided in a bearing, such seals are usually crimped into an undercut groove in one of the rings and extend across the space between the rings and often into a rabbeted or turned out portion in the opposite ring. When there are no filling slots, such rabbeted portion and such undercut groove do not take up much space axially of their respective rings and ample shoulder space at the edges of the rings is left for engagement with housing or shaft abutments. This usual construction is illustrated quite well at the right-hand side of Fig. 2 wherein the plate seal 10 is shown as being crimped into an undercut groove 11. The plate seal extends across the space between the two rings and into a rabbeted portion 12 in the inner ring. This construction while providing a generally quite effective seal leaves substantial portions of each ring as indicated at 13—14 for engagement with housing or shaft abutments. However, if the same ring were to be applied to the opposite or left-hand side of the bearing as shown in Fig. 2, it will be seen that the plate would not cover the filling slots and the bearing would not be effectively sealed. On the other hand, if the seal plate were made larger, the undercut groove corresponding to the groove 11 would have to be made sufficiently large in diameter so that the bearing shoulder on the outer ring would be very narrow, say, of the extent shown at 15. The rabbeted portion on the inner ring would also have to be of such an extent that the shoulder for engagement with the shaft abutment would be very small, say, from the cross pin to the bore of the inner ring, as indicated at 16. Such surfaces are in many cases entirely inadequate and interfere with certain parts of the housing or shaft abutment and their proper operation.

My invention relates particularly to means whereby adequate shoulders may be left on the filling slot side of the bearing and yet the bearing will be effectively sealed. The ring carrying the seal plate 17 (in the present showing the outer ring 5) is provided with an undercut groove indicated at 18 and the available shoulder therefore extends from the edge 19 to the outer circumferential wall of the outer ring. The seal plate is crimped into this undercut groove as indicated at 20 and at the region of the filling slot 8, the seal plate 17 is provided with a generally radially outwardly projecting tongue 21 to completely cover and mask the filling slot 8 and preferably fits up against the wall 22 formed by what in this case is an arc-shaped opening 23 milled or rabbeted out of the outer ring adjacent the filling slot. Thus, the seal plate 17 is securely held to the outer ring so as to form a perfectly tight seal even in the region of the filling slot 8 and yet almost the entire edge of the outer ring is left intact to act as the surface to engage a housing abutment.

The other ring, that is, the ring not carrying the seal plate, in the present illustrative form shown the inner ring, is provided with means to close its filling slot and in the form shown I provide a filler member in the form of a generally arcuate plate 24 which may fit into a groove 25 formed in the inner ring transversely of the filling slot 9. The arcuate plate 24 is held rigidly in its groove in the inner ring 6 by any suitable means such as a pin 26 driven into suitable openings in the ring and filler member 24. The outer circumferential edge 27 of the filler member 24 preferably forms substantially a circumferential continuation of the ring adjacent the side edges of the filling slot. The plate 24 is set back from the edge of the inner ring and the latter is preferably rabbeted out as indicated at 28 so that the outside of the plate 24 forms a continuation of the radial rabbeted portion of the inner ring and the seal plate 17 extends into the rabbeted portion and into sealing proximity to the rabbeted portion and filler member 24. It will be seen that the rabbeted portion 28 need not extend axially far into the edge of the inner bearing ring and substantially all of the adjacent edge of the inner ring is available for engagement with shaft abutments. At the same time, the plate seal 17 will be as effective in sealing the bearing, both at the outer ring and at the inner ring, as will the corresponding seal plate 10 at the opposite side of the bearing.

My improved construction, therefore, permits of the use of an effective plate seal on the filling slot side of a bearing and this without substantial impairment of the extent of available abutment surfaces of the two rings as has been described. In case only one of the rings is provided with a filling slot, then either the filler member, such as 24 may be employed, or the tongue on the seal plate may be employed where the seal is in the ring which is to carry such seal plate.

While the invention has been described in considerable detail and preferred forms illustrated, it is to be understood that various changes may be made within the scope of the invention as defined in the appended claims.

I claim:

1. A bearing comprising inner and outer bearing rings with interposed anti-friction bearing members, one of said rings having a filling slot and an outwardly opening counterbore leaving an abrupt shoulder between said counterbore and filling slot, a seal plate rigidly secured to said bearing ring having said filling slot and being of a diameter insufficient to cover said filling slot, said seal plate having a radially extending tongue portion thereon to mask said filling slot and extend into said counterbore and abut said shoulder.

2. A bearing comprising inner and outer bearing rings with interposed anti-friction bearing members, one of said rings having a filling slot and an outwardly opening counterbore leaving an abrupt shoulder between said counterbore and said filling slot, a circumferentially extending seal groove in said bearing ring, a seal plate seated in said groove, said seal plate being of a general diameter insufficient to cover said filling slot, said seal plate having an integral tongue extending over said filling slot to mask the same and extending into said counterbore and abutting said abrupt shoulder.

3. A bearing comprising inner and outer bearing rings with interposed anti-friction bearing members, one of said bearing rings having a filling slot, a groove in said bearing ring extending transversely of said filling slot, a filler plate to fill said filling slot mounted in said groove and a pin extending in an axial direction through said filler plate and in an axial direction into said ring at both sides of said groove for securing said filler plate therein.

4. A bearing comprising inner and outer bearing rings with interposed anti-friction bearing members, one of said rings having a filling slot, a filler member in said filling slot to fill the same, and having a circumferential form to provide a generally circumferential continuation of the surface of said ring adjacent said filler slot, the edge of said ring having said filler member being rabbeted, and one side of said filler member forming a substantial continuation of said rabbeted portion, and a seal plate carried by the other of said bearing rings and fitting into said rabbeted portion and into sealing proximity to said rabbeted portion and filler member.

RAYMOND R. SEARLES.